United States Patent
Kataeva (10) Patent No.: US 11,586,888 B2
(45) Date of Patent: Feb. 21, 2023

(54) CONVOLUTIONAL NEURAL NETWORK

(71) Applicant: DENSO CORPORATION, Kariya (JP)

(72) Inventor: Irina Kataeva, Kariya (JP)

(73) Assignee: DENSO CORPORATION, Kariya (JP)

( * ) Notice: Subject to any disclaimer, the term of this patent is extended or adjusted under 35 U.S.C. 154(b) by 663 days.

(21) Appl. No.: 16/688,088

(22) Filed: Nov. 19, 2019

(65) Prior Publication Data

US 2020/0082255 A1    Mar. 12, 2020

Related U.S. Application Data

(63) Continuation of application No. PCT/JP2018/011272, filed on Mar. 22, 2018.

(30) Foreign Application Priority Data

May 29, 2017    (JP) .............................. JP2017-105742

(51) Int. Cl.
| | |
|---|---|
| *G06N 3/063* | (2006.01) |
| *G06N 3/04* | (2006.01) |
| *G06F 17/15* | (2006.01) |

(52) U.S. Cl.
CPC ............. *G06N 3/063* (2013.01); *G06F 17/15* (2013.01); *G06N 3/04* (2013.01)

(58) Field of Classification Search
CPC ........... G06N 3/063; G06N 3/04; G06F 17/15
See application file for complete search history.

(56) References Cited

U.S. PATENT DOCUMENTS

| | | |
|---|---|---|
| 2016/0336064 A1 | 11/2016 | Seo et al. |
| 2017/0017879 A1 | 1/2017 | Kataeva et al. |
| 2017/0316828 A1 | 11/2017 | Hu et al. |
| 2018/0018559 A1 | 1/2018 | Yakopcic et al. |

(Continued)

FOREIGN PATENT DOCUMENTS

| | | |
|---|---|---|
| WO | 2016068953 A | 5/2016 |
| WO | 2017010049 A | 1/2017 |

OTHER PUBLICATIONS

Shafiee et al, "ISAAC: A Convolutional Neural Network Accelerator with In-Situ Analog Arithmetic in Crossbars", 2016, ACM/IEEE 43rd Annual International Symposium on Computer Architecture, pp. 14-26 (13 pages) (Year: 2016).*

(Continued)

*Primary Examiner* — David F Dunphy
(74) *Attorney, Agent, or Firm* — Maschoff Brennan (57) ABSTRACT

A convolutional neural network includes: convolution layers and a merging layer. At least one convolution layer includes a crossbar circuit having input bars, output bars and weight assignment elements that assign weights to input signals. The crossbar circuit performs a convolution operation in an analog region with respect to input data including the input signal by adding the input signals at each output bar. The input data includes feature maps. The crossbar circuit includes a first crossbar circuit for performing the convolution operation with respect to a part of the feature maps and a second crossbar circuit for performing the convolution operation with respect to another part of feature maps. The merging layer merges convolution operation results of the first and second crossbar circuits.

5 Claims, 8 Drawing Sheets

(56) References Cited

U.S. PATENT DOCUMENTS

2019/0035463 A1    1/2019  Hu et al.

OTHER PUBLICATIONS

A. Krizhevsky, I. Sutskever, and G. E. Hinton, "Imagenet classification with deep convolutional neural networks," in Advances in neural information processing systems, pp. 1097-1105, 2012.
C. Szegedy,W. Liu, Y. Jia, P. Sermanet, S. Reed, D. Anguelov, D. Erhan, V. Vanhoucke, and A. Rabinovich, "Going deeper with convolutions," arXiv preprint arXiv:1409.4842, 2014.
K. K. Likharev, "CrossNets: Neuromorphic hybrid CMOS/ nanoelectronic networks", Sci. Adv. Mater., vol. 3, pp. 322-331, Jun. 2011.
Springenberg, Jost Tobias, et al. "Striving for simplicity: The all convolutional net." arXiv preprint arXiv:1412.6806 (2014).
V. Mnih, K. Kavukcuoglu, D. Silver, A. A. Rusu, J. Veness, M. G. Bellemare, A. Graves, M. Riedmiller, A. K. Fidjeland, G. Ostrovski, et al., "Human-level control through deep reinforcement learning," Nature, vol. 518, No. 7540, pp. 529-533, 2015.
M. Prezioso, F. Merrikh-Bayat, B. D. Hoskins, G. C. Adam, K. K. Likharev, and D. B. Strukov, (2015). Training and operation of an integrated neuromorphic network based on metal-oxide memristors. Nature, 521(7550), 61-64.
Y. LeCun, et al. "Gradient-based learning applied to document recognition."Proceedings of the IEEE 86.11 (1998): 2278-2324.
Y. Wang, et al. "Low Power Convolutional Neural Networks on a Chip," ISCAS'2016.

\* cited by examiner

| HIERARCHY OF CONVOLUTION LAYER | DESCRIPTION | NO. OF FILTERS (FEATURE MAPS) | STRIDE | NO. OF CROSSBARS REQD. | |
|---|---|---|---|---|---|
| | | | | INPUT | OUTPUT |
| 1 | 3×3 CONVOLUTION | 96 | 1 | 28 (3×3×3+1) | 192 (96×2) |
| 2 | 3×3 CONVOLUTION | 96 | 1 | 865 (96×3×3+1) | 192 (96×2) |
| | 3×3 AVERAGE POOLING | — | 2 | — | — |
| 3 | 3×3 CONVOLUTION | 192 | 1 | 865 (96×3×3+1) | 384 (192×2) |
| 4 | 3×3 CONVOLUTION | 192 | 1 | 1729 (192×3×3+1) | 384 (192×2) |
| | 3×3 AVERAGE POOLING | — | 2 | — | — |
| 5 | 3×3 CONVOLUTION | 192 | 1 | 1729 (192×3×3+1) | 384 (192×2) |
| 6 | 1×1 CONVOLUTION | 192 | 1 | 193 (192×1×1+1) | 384 (192×2) |
| 7 | 1×1 CONVOLUTION | 10 | 1 | 193 (192×1×1+1) | 20 (10×2) |

FIG. 7

| HIERARCHY | NO. OF CROSSBARS REQD. | | EX 1 OF NO. OF DIVIDED CROSSBAR CIRCUITS (512x512 MAX.) | EX 2 OF NO. OF DIVIDED CROSSBAR CIRCUITS (1024x1024 MAX.) |
|---|---|---|---|---|
| | INPUT | OUTPUT | | |
| 1 | 28 (3×3×3+1) | 192 (96×2) | 1 | 1 |
| 2 | 865 (96×3×3+1) | 192 (96×2) | 2 | 1 |
| 3 | 865 (96×3×3+1) | 384 (192×2) | 2 | 1 |
| 4 | 1729 (192×3×3+1) | 384 (192×2) | 4 | 2 |
| 5 | 1729 (192×3×3+1) | 384 (192×2) | 4 | 2 |
| 6 | 193 (192×1×1+1) | 384 (192×2) | 1 | 1 |
| 7 | 193 (192×1×1+1) | 20 (10×2) | 1 | 1 |

FIG. 9

| HIERARCHY | NO. CROSSBARS REQD. | | EX 1 OF NO. OF DIVIDED CROSSBAR CIRCUITS | EX 2 OF NO. OF DIVIDED CROSSBAR CIRCUITS |
|---|---|---|---|---|
| | INPUT | OUTPUT | | |
| 1 | 28 (3×3×3+1) | 192 (96×2) | 1 | 1 |
| 2 | 865 (96×3×3+1) | 192 (96×2) | 2 | 1 |
| 1ST MERGE | 97 (96+1) | 192 (96×2) | REQUIRED | NOT REQUIRED |
| 3 | 865 (96×3×3+1) | 384 (192×2) | 2 | 1 |
| 2ND MERGE | 193 (192+1) | 384 (192×2) | REQUIRED | NOT REQUIRED |
| 4 | 1729 (192×3×3+1) | 384 (192×2) | 4 | 2 |
| 3RD MERGE | 193 (192+1) | 384 (192×2) | REQUIRED | REQUIRED |
| 5 | 1729 (192×3×3+1) | 384 (192×2) | 4 | 2 |
| 4TH MERGE | 193 (192+1) | 384 (192×2) | REQUIRED | REQUIRED |
| 6 | 193 (192×1×1+1) | 384 (192×2) | 1 | 1 |
| 7 | 193 (192×1×1+1) | 20 (10×2) | 1 | 1 |

|  | AVERAGE ERROR WITHOUT DIVISION (%) | AVERAGE ERROR WITH DIVISION (%) | | |
|---|---|---|---|---|
|  |  | NO MERGING LAYER | MERGING LAYER CONFIGURED AS ONE LAYER | MERGING LAYER CONFIGURED AS TWO LAYERS |
| DIVISION EX 1 | 9.17±0.13 | 13.1±0.43 | 11.17±0.24 | 11.15±0.04 |
| DIVISION EX 2 | 9.17±0.13 | 11.22±0.14 | 10.2±0.26 | 9.64±0.25 |

CONVOLUTIONAL NEURAL NETWORK

CROSS REFERENCE TO RELATED APPLICATION

The present application is a continuation application of International Patent Application No. PCT/JP2018/011272 filed on Mar. 22, 2018, which designated the U.S. and claims the benefit of priority from Japanese Patent Application No. 2017-105742 filed on May 29, 2017. The entire disclosures of all of the above applications are incorporated herein by reference.

TECHNICAL FIELD

The present disclosure relates to a convolutional neural network including a plurality of convolution layers.

BACKGROUND

Recently, it is verified that the use of a deep neural network and a deep learning algorithm can provide the recognition performance highly superior the recognition performance using the conventional machine learning in the field of image recognition, for example. Generally, a convolutional neural network is used as the deep neural network. The convolutional neural network repeats convolution and pooling on a local region (filter) to extract a feature and transmits the feature to an output layer via a fully connected layer. From the output layer, for example, the softmax function is used to output an output value representing the probability belonging to each class to be classified.

SUMMARY

According to an example, a convolutional neural network includes: convolution layers and a merging layer. At least one convolution layer includes a crossbar circuit having input bars, output bars and weight assignment elements that assign weights to input signals. The crossbar circuit performs a convolution operation in an analog region with respect to input data including the input signal by adding the input signals at each output bar. The input data includes feature maps. The crossbar circuit includes a first crossbar circuit for performing the convolution operation with respect to a part of the feature maps and a second crossbar circuit for performing the convolution operation with respect to another part of feature maps. The merging layer merges convolution operation results of the first and second crossbar circuits.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

A conceivable convolutional neural network repeats many operations such as addition, multiplication, and division for the convolution and the pooling. The use of a CPU or a GPU to perform operations on the convolutional neural network causes a large number of operation loads and increases power consumption.

A dedicated hardware circuit is under development to efficiently perform the operations. Examples of the hardware circuit include a crossbar circuit using resistive random access memory (memristor) that can be set to different resistance states depending on applied voltages or currents, for example.

The crossbar circuit includes many input bars and output bars intersecting with each other. The input bar and the output bar are connected at each intersection point via the memristor. When an input signal is input to the input bar of the crossbar circuit, each input signal is multiplied by a conductance as a weight provided by the memristor and is integrated with the output bar. Therefore, the crossbar circuit can perform the convolution operation by allowing each memristor to include the conductance corresponding to the weight of each element of a filter on a given convolution layer in the above-mentioned convolutional neural network, for example.

Suppose the above-mentioned crossbar circuit performs the convolution operation on the filter in a convolution layer at the higher hierarchy viewed from the output layer. Then, input bars are needed to integrate a result of the convolution operation on the filter for each feature map generated in a convolution layer at the lower hierarchy. The number of the necessary input bars is found by calculating "the number of feature maps generated in the convolution layer at the lower hierarchy"×"filter size"+1". The filter size is available as 3×3 or 5×5, for example. The addition of "1" to the number of input bars requires an input bar to supply a bias.

A large-scale convolutional neural network may use many filters for one convolution layer. In this case, the convolution layer generates many feature maps. For example, over a thousand input bars may be needed for a crossbar circuit in the convolution layer at the higher hierarchy.

However, the physical size of a crossbar circuit, namely, the number of input bars or output bars are limited by factors such as an IR drop on the wiring and the maximum allowable current for the wiring. Therefore, the large-scale convolutional neural network is liable to prevent a convolution layer at the higher hierarchy from using the crossbar circuit for convolution operation.

In view of the above points, a convolutional neural network is provided using a crossbar circuit for convolution operation even when many input bars are needed for the convolution operation in a convolution layer.

According to an example embodiment, a convolutional neural network includes: a plurality of convolution layers; and a merging layer. At least one of the convolution layers includes a crossbar circuit having a plurality of input bars, a plurality of output bars intersecting with the input bars, and a plurality of weight assignment elements that are arranged at intersections between the input bars and the output bars and assign weights to input signals input into the input bars. The weights correspond to a plurality of filters to be convoluted. Under a condition that each weight assignment element assigns a weight to an input signal input into each of the input bars, the crossbar circuit in the at least one of the convolution layers performs a convolution operation of the filters in an analog region with respect to input data including the input signal by adding the input signals at each output bar. The input data includes a plurality of feature maps. The crossbar circuit in the at least one of the convolution layers includes a first crossbar circuit and a second crossbar circuit. The first crossbar circuit is configured to perform the convolution operation of the filters with respect to a part of the feature maps. The second crossbar circuit is arranged independently from the first crossbar circuit, and is configured to perform the convolution operation of the filters with respect to another part of feature maps different from the part of the feature maps as a target of the convolution operation in the first crossbar circuit. The merging layer merges a convolution operation result of the first crossbar circuit with a convolution operation result of the second crossbar circuit.

As above, the convolutional neural network configures the crossbar circuit to include the first crossbar circuit and the second crossbar circuit provided independently in at least one of the convolution layers. A given convolution layer may require the number of input bars that exceeds a physical upper limit of the crossbar circuit. Even in such a case, the number of required input bars can be distributed to a plurality of crossbar circuits including the first crossbar circuit and the second crossbar circuit. The convolution operation can be performed in the crossbar circuit.

The first crossbar circuit outputs an arithmetic result (feature map) by performing convolution operation on filters corresponding to part of feature maps. The second crossbar circuit outputs an arithmetic result (feature map) by performing convolution operation on filters corresponding to another part of feature maps different from the feature maps for which the first crossbar circuit performs convolution operation. Distinct arithmetic results from the first crossbar circuit and the second crossbar circuit are not based on all the input feature maps. The recognition performance may degrade if the convolution operation results are directly used to continue processes in the convolutional neural network.

The convolutional neural network further includes the merging layer that merges a convolution operation result from the first crossbar circuit with a convolution operation result from the second crossbar circuit. The merge result of merging the arithmetic results is based on all the feature maps. The merge result from the merging layer can be used to continue subsequent processes in the convolutional neural network and suppress degradation of the recognition performance.

According to the above-mentioned configuration, the merging layer favorably merges elements with each other corresponding to an arithmetic result from the first crossbar circuit and an arithmetic result from the second crossbar circuit. When the corresponding elements are merged, the merge process in the merging layer can use a crossbar circuit configured similarly to the crossbar circuit in the convolution layer.

According to the above-mentioned configuration, the merging layer includes a crossbar circuit including a plurality of input bars, a plurality of output bars intersecting with the input bars, and a plurality of weight assignment elements that are provided at intersection points between the input bars and the output bars and weight elements of convolution operation results supplied to the input bars. It is favorable that the crossbar circuit in the merging layer allows a weight assignment element to weight elements corresponding to a convolution operation result from the first crossbar circuit and a convolution operation result from the second crossbar circuit and elements are added and thereby merged at each output bar. It is possible to efficiently operate the merge process by configuring the merging layer using the crossbar circuit.

The description below explains an embodiment of the convolutional neural network (convolution neural network) according to the present disclosure with reference to the accompanying drawings. The following embodiment explains an example of applying the convolutional neural network to the use of classifying images as input data into a plurality of categories. The convolutional neural network can be applied to other uses. For example, the convolutional neural network can be applied to the detection of objects or persons, the recognition of human faces, or the recognition of road signs.

Figure 1:
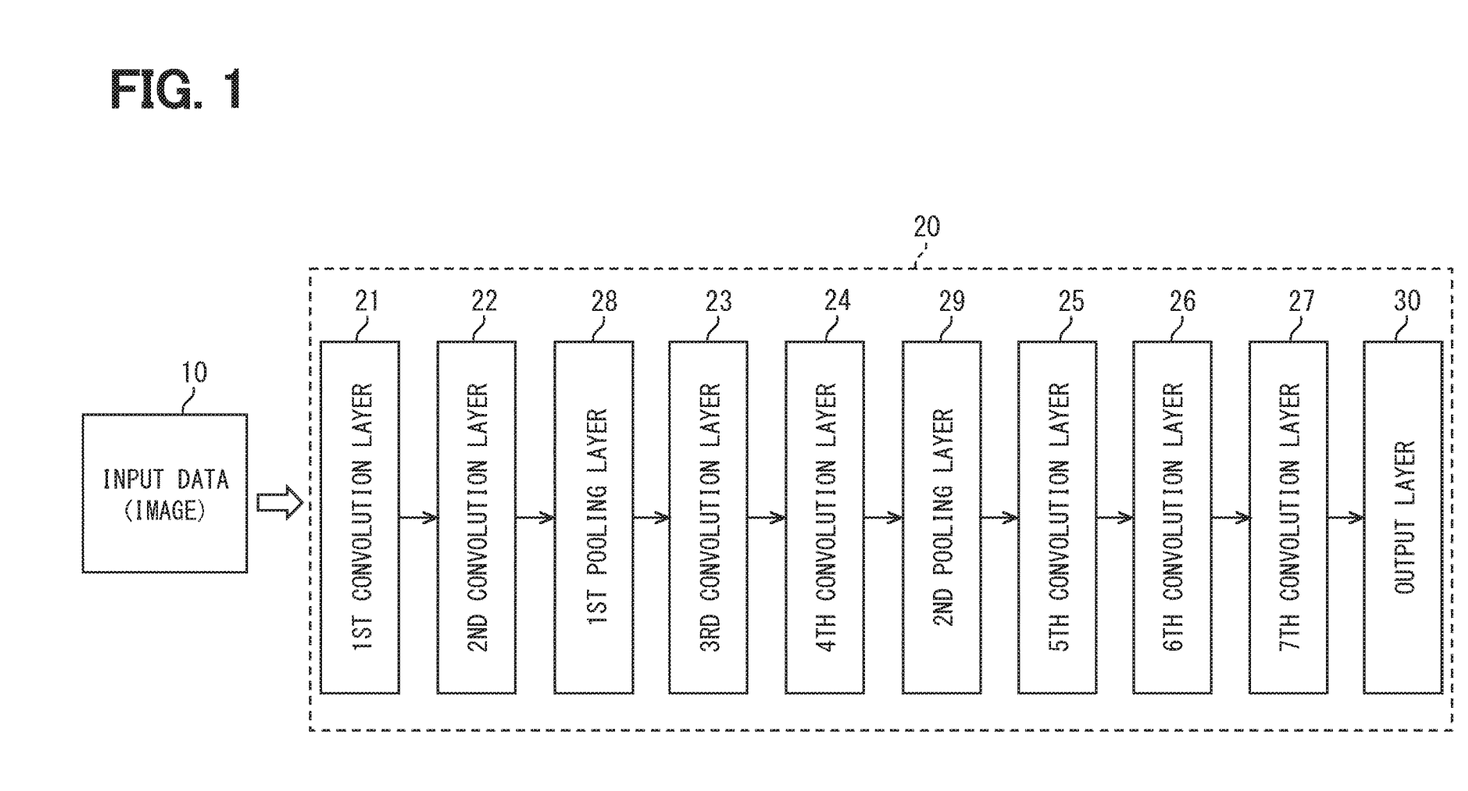
FIG. 1 is a diagram conceptually illustrating a structure of the convolutional neural network according to an embodiment.

FIG. 1 conceptually illustrates the structure of a convolutional neural network 20 according to the present embodiment. The convolutional neural network 20 is basically structured to alternately connecting convolution layers and pooling layers. According to the example in FIG. 1, the convolutional neural network 20 includes seven convolution layers such as a first convolution layer 21, a second convolution layer 22, a third convolution layer 23, a fourth convolution layer 24, a fifth convolution layer 25, a sixth convolution layer 26, and a seventh convolution layer 27. A first pooling layer 28 is provided between the second convolution layer 22 and the third convolution layer 23. A second pooling layer 29 is provided between the fourth convolution layer 24 and the fifth convolution layer 25.

The pooling layer is not necessarily connected next to the convolution layer in the convolutional neural network 20. The pooling layer may be connected after a plurality of convolution layers are connected. The number of layers such as the convolution layers 21 through 27 and the pooling layers 28 and 29 is not limited to the example in FIG. 1.

Generally, an increase in the number of layers such as the convolution layers 21 through 27 and the pooling layers 28 and 29 can moreover improve the recognition performance.

The first through seventh convolution layers 21 through 27 operate to convolute a specifically sized (such as 3×3 or 5×5) filter corresponding to respectively input data (image). The operation is basically the same as filter convolution in ordinary image processing such as two-dimensionally convoluting a small-sized image (filter) into an input image to blur the image or emphasize edges. Specifically, the first through seventh convolution layers 21 through 27 perform the convolution operation by integrating each of multiplication results acquired by multiplying each pixel value (weight) of a small-sized image as the filter by each pixel value of a region sized equally to the filter in an input image as input data. When the input data includes a plurality of input images, the same filter is used to perform the convolution operation in the same region of the input images. Results from the convolution operations are further integrated. The calculated integration results are correspondingly output to the filter positions in the convolution layers 21 through 27 via an activation function such as ReLU or tanh.

The learning determines a filter weight. The present embodiment performs supervised learning after the convolutional neural network 20 is built on a computer. The learning is also targeted at a filter weight for a merging layer and a bias input size (to be described) as well as the above-mentioned filter weight. When the learning terminates, the learned value is assigned to a crossbar circuit (to be described).

The filter is shifted over the input image based on a specified stride. The above-mentioned convolution operation is performed at each shift position. The convolution layers 21 through 27 generate outputs corresponding to the filter positions all over the input image. The set of the outputs is comparable to the outputs from the convolution layers 21 through 27. The outputs are composed into a two-dimensional result to correspond to the filter shift positions and provide output data from the convolution layers 21 through 27. The output data is used as input data to a convolution layer at the next hierarchy. Output data from the convolution layers 21 through 27 is formed as a two-dimensionally arranged image and is generally referred to as a feature map. Feature maps are generated as many as the number of filters used for the convolution layers 21 through 27. Therefore, input data containing a plurality of input images (feature maps) is supplied to the second convolution layer 22 and later, namely, the convolution layers 22 through 27.

When a color image is input, even the first convolution layer 21 is supplied with three images corresponding to RGB. The present embodiment uses color images as input data. When a grayscale image is input, the first convolution layer 21 is supplied with only one image.

The present embodiment configures the sixth and seventh convolution layers 26 and 27 to use a filter sized to 1×1. The sixth and seventh convolution layers 26 and 27 perform a 1×1 convolution operation that multiplies a filter-derived weight by a pixel value at the same position in each input image and adds the pixel values. A fully connected layer can be used for the sixth and seventh convolution layers 26 and 27. However, the present embodiment uses a crossbar circuit to perform the convolution operation on the convolution layers 21 through 27 including the sixth and seventh convolution layers 26 and 27 in an analog region and therefore uses the convolution layer to perform the 1×1 convolution operation as above. The use of the fully connected layer excessively increases the number of input bars, making it difficult to use one crossbar circuit as a solution. The crossbar circuit will be described later in detail.

The first and second pooling layers 28 and 29 discard part of the information representing high compatibility between the filter and positions in an input image, thereby improve invariance against positional change in a feature appearing in the input image and reduce the image size to possibly reduce the amount of calculation later on.

Specifically, the first and second pooling layers 28 and 29 provide a window having a specified size (such as 2×2 or 3×3) for an input image and collect a plurality of pixel values in the input image by averaging pixel values in the window (average pooling) or using a maximum one of the pixel values in the window (maximum pooling). The present embodiment configures the first and second pooling layers 28 and 29 to perform the average pooling so that the crossbar circuit is used to perform processes also in the first and second pooling layers in an analog region.

The pooling shifts the window over the input image so that the window prevents applicable positions from overlapping or allows only part of the applicable positions to overlap. For example, when the window size is 2×2 and the window is shifted based on a 2-pixel stride to prevent an overlap, the pooling reduces the number of pixels in the input image to ¼. The pooling is performed on each input image (feature map). The number of input images is unchanged before and after the pooling.

An output layer 30 outputs a probability of causing an image as input data 10 to belong to each of the categories to be classified based on the normalization by use of the softmax function, for example. The image as the input data 10 can be classified into the categories by the selection of a category corresponding to the highest probability output from the output layer 30.

Figure 2:
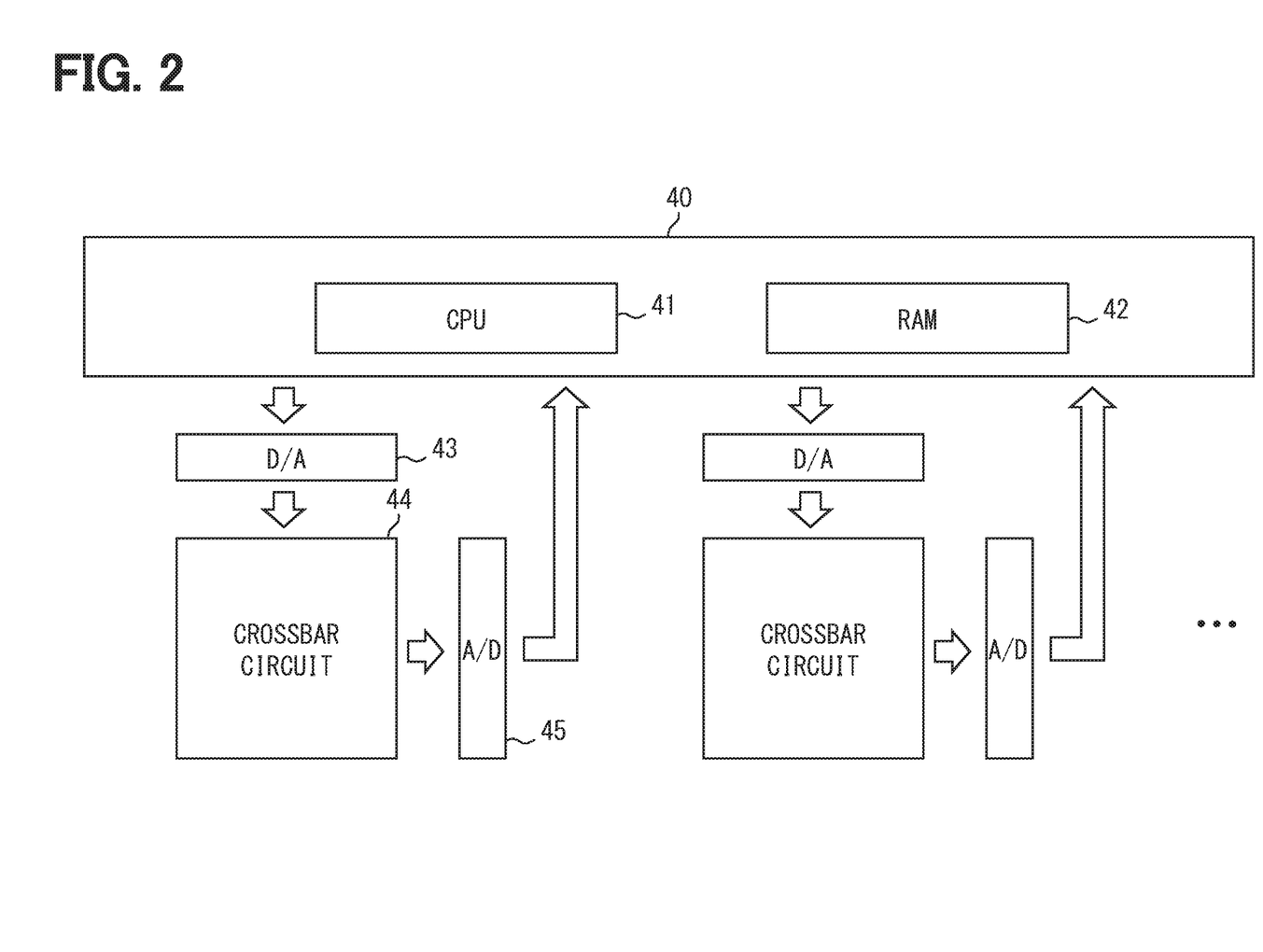
FIG. 2 is a configuration diagram illustrating a configuration of the convolutional neural network in FIG. 1 embodied by using crossbar circuits.

The description below explains a configuration to embody the convolutional neural network 20 configured as above by use of a crossbar circuit with reference to FIG. 2. As illustrated in FIG. 2, the present embodiment mainly includes a microcomputer 40, a D/A converter circuit 43, a crossbar circuit 44, and an A/D converter circuit 45 as component elements to embody the convolutional neural network 20.

Figure 3:
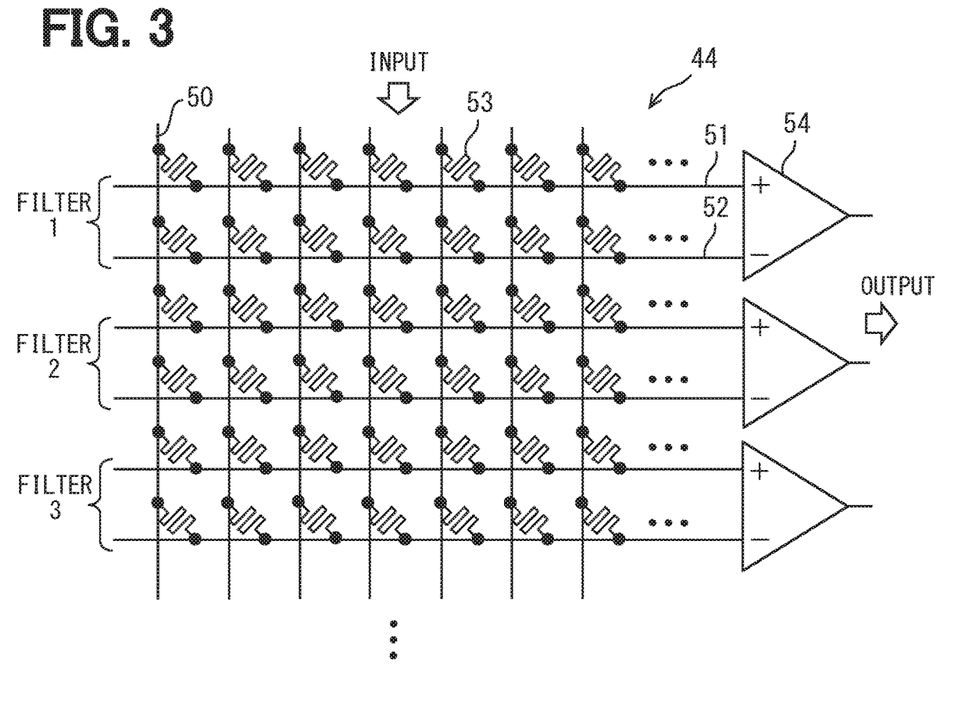
FIG. 3 is an explanatory diagram illustrating the crossbar circuit.

Firstly, the crossbar circuit 44 will be described based on FIGS. 3 through 5. As illustrated in FIG. 3, the crossbar circuit 44 includes a plurality of input bars 50, a plurality of output bars 51 and 52, a plurality of weight assignment elements 53, and a plurality of differential operational amplifiers 54.

The microcomputer 40 supplies the input bars 50 with an input signal (voltage signal) corresponding to each pixel value in a region sized equally to the above-mentioned filter in the input image. The output bars 51 and 52 are placed to intersect with the input bars 50.

Figure 4:
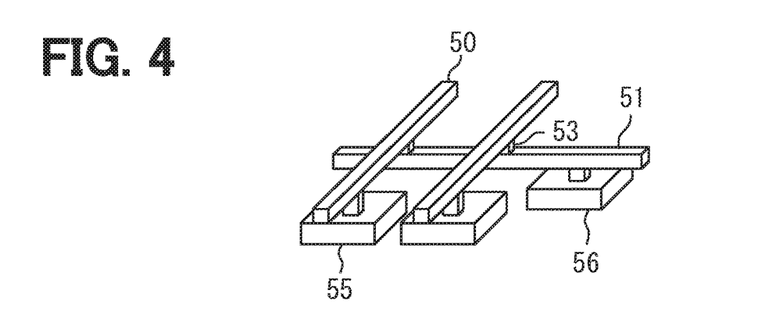
FIG. 4 is another explanatory diagram illustrating the crossbar circuit.

As illustrated in FIG. 4, for example, the input bars 50 and the output bars 51 and 52 can be formed on a CMOS substrate where a CMOS element is formed. In this case, the input bar 50 is supplied with the voltage signal corresponding to the above-mentioned pixel value via an input neuron 55 comprised of a CMOS element. An intersection point between the input bar 50 and the output bar 51 is provided with the memristor as a weight assignment element 53. The input bar 50 and the output bar 51 are connected via the memristor.

The memristor signifies resistive random access memory that can be set to different resistance states between the minimum and maximum values depending on applied voltages or currents. For example, an unshown voltage application circuit can be used to increase the conductance of the memristor by applying a negative write voltage and decrease the conductance of the memristor by applying a positive write voltage. The memristor maintains the activated resistance state (conductance) unless a voltage exceeding the positive or negative write voltage is applied. Elements available for the memristor include Pt/TiO2/Pt metal oxide element, phase change memory, and magnetic tunnel junction memory.

Figure 5:
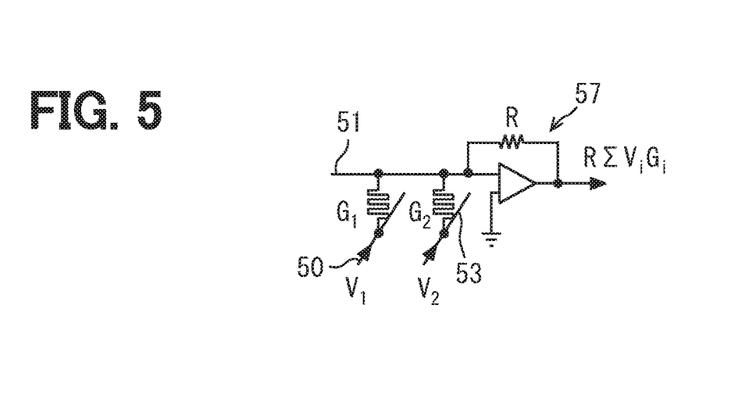
FIG. 5 is yet another explanatory diagram illustrating the crossbar circuit.

FIG. 5 illustrates an electric circuit representing the configuration in FIG. 4. As illustrated in FIG. 5, the CMOS element configuring an output neuron 56 connected to the output bar 51 forms an operational amplifier. Resistor R is connected between input and output of the operational amplifier to configure an adder. As illustrated in FIG. 5, the input neuron 55 supplies the input bars 50 with voltage signals V1 and V2 that are multiplied by conductances G1 and G2 from the memristors as the weight assignment elements 53 and are then added. The adder multiplies the addition result by R. As equation 1 below expresses, the output neuron 56 outputs a result found by integrating results of multiplying voltage signals V1, V2, and so on from the input bars 50 by conductances G1 and G2 from the memristors and further multiplying the integration result by R.

Output voltage from the output neuron=R$\Sigma$ViGi  (Equation 1)

As illustrated in FIG. 3, the output bar 51 is connected to a non-inverting input terminal of the differential operational amplifier 54 and the output bar 52 is connected to an inverting input terminal of the differential operational amplifier 54. The differential operational amplifier 54 is configured by use of a CMOS element on the CMOS substrate. FIG. 3 omits the adder in FIG. 5. Moreover, FIG. 3 omits the circuit to perform the process as the above-mentioned activation function. Actually, the activation function is provided at the output side of the differential operational amplifier 54.

According to the present embodiment, the output bars 51 and 52 are connected to the non-inverting input terminal and the inverting input terminal of the differential operational amplifier 54, respectively. A negative weight and a positive weight can be used as the filter to perform the convolution operation. When an input signal is multiplied by a positive weight, it just needs to set the conductance of the weight assignment element 53 provided between the output bar 51 and the input bar 50 connected to the non-inverting input terminal to be larger than the conductance of the weight assignment element 53 provided between the output bar 52 and the input bar 50 connected to the inverting input terminal by the positive weight to use. When an input signal is multiplied by a negative weight, it just needs to set the conductance of the weight assignment element 53 provided between the output bar 52 and the input bar 50 connected to the inverting input terminal to be larger than the conductance of the weight assignment element 53 provided between the output bar 51 and the input bar 50 connected to the non-inverting input terminal by the negative weight to use.

As illustrated in FIG. 3, the present embodiment configures two output bars 51 and 52 as a set and assigns a weight corresponding to each of filters 1, 2, 3, and so on to the weight assignment element 53 between the set of the output bars 51 and 52 and the input bars 50.

The microcomputer 40 mainly includes a CPU 41, RAM 42, and ROM and performs various processes according to a program stored in the ROM, for example. A process targeted at the first convolution layer 21 will be described below. However, the microcomputer 40 performs a similar process on the other convolution layers 22 through 27.

The microcomputer 40 designates a region to perform the convolution operation on the filter in an image as the input data 10 and outputs a digital signal corresponding to a pixel value of each pixel contained in the region to the D/A converter circuit 43. The D/A converter circuit 43 outputs an analog signal (voltage signal) corresponding to each pixel value in the region to perform the convolution operation to the crossbar circuit 44.

The microcomputer 40 performs a process to incorporate output from the A/D converter circuit 45 at the timing when the arithmetic processing in the crossbar circuit 44 terminates to generate an output. Outputs are available after processed by as many convolution operations and activation functions as the filters used for the first convolution layer 21 at a specified filter position. The A/D converter circuit 45 converts the outputs into digital signals and outputs the digital signals. The microcomputer 40 classifies the digital signals output from the A/D converter circuit 45 into the filters and accordingly stores the digital signals in the RAM 42.

The microcomputer 40 shifts the region to perform the convolution operation on the filter by a specified stride in the input image, outputs a digital signal corresponding to the pixel value contained in the shifted region and performs a process similar to the above. This is repeated until completion of shifting the filters in all regions of the input image. The RAM 42 thereby stores digital data representing as many feature maps as the filters generated for the first convolution layer 21.

One convolution layer may use many filters if a large-scale network is constructed in the convolutional neural network 20 configured as above. In this case, the convolution layer may generate many feature maps. In such a case, the crossbar circuit 44 in the convolution layer at the next hierarchy (higher hierarchy) may need over a thousand input bars 50, for example.

For example, suppose the convolutional neural network 20 structured as illustrated in FIG. 1 performs the convolution operation by using the 3×3-size filter on the first through fifth convolution layers 21 through 25. Besides, suppose the first and second convolution layers 21 and 22 use 96 filters, the third through sixth convolution layers 23 through 26 use 192 filters, and the seventh convolution layer 27 uses ten filters. Then, FIG. 6 illustrates the number of the input bars 50 and the output bars 51 and 52 required for the convolution layers 21 through 27.

When the 3×3 filter is used to perform the convolution operation on three RGB images in the first convolution layer 21, the number of the input bars 50 needed for the convolution operation is found by calculating the number of input images (3)×filter size (3×3)+bias input (1)=28. The number of the output bars 51 and 52 is found by calculating one set of output bars (2)×the number of filters (96)=192.

Figure 6:
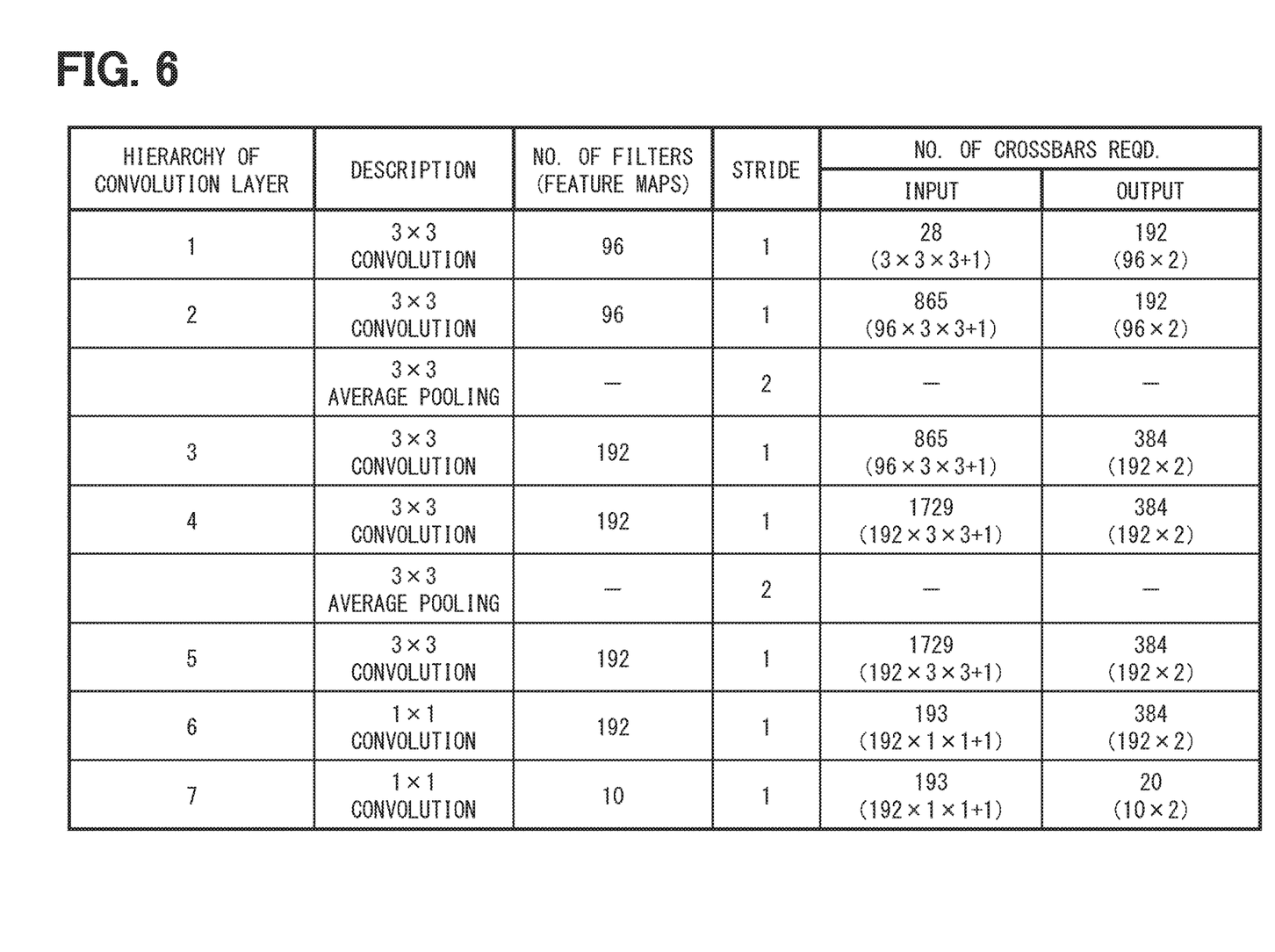
FIG. 6 is a diagram illustrating the number of input bars and output bars needed for each convolution layer in the convolutional neural network structured as illustrated in FIG. 1 when the first through fifth convolution layers perform convolution operation by using a 3×3-size filter, the sixth and seventh convolution layers perform convolution operation by using a 1×1-size filter, the first and second convolution layers use 96 filters, the third through sixth convolution layers use 192 filters, and the seventh convolution layer uses 10 filters.

Similarly, when calculating the number of crossbars required for the second through seventh convolution layers 22 through 27, as illustrated in FIG. 6, the second convolution layer 22 requires the 865 input bars 50 and the 192 output bars 51 and 52. The third convolution layer 23 requires the 865 input bars 50 and the 384 output bars 51 and 52. The fourth and fifth convolution layers 24 and 25 require the 1729 input bars 50 and the 384 output bars 51 and 52. The sixth convolution layer 26 requires the 193 input bars 50 and the 384 output bars 51 and 52. The seventh convolution layer 27 requires the 193 input bars 50 and the 20 output bars 51 and 52.

The use of many filters for a given convolution layer also increases the number of generated feature maps. Therefore, the crossbar circuit 44 in the convolution layer at the next (higher) hierarchy drastically increases the number of necessary input bars.

However, the physical size of the crossbar circuit 44, namely, the number of the input bars or the output bars is limited by factors such as an IR drop on each wiring and the maximum allowable current for each wiring. The number of the input bars 50 and the output bars 51 and 52 is practically limited to 512×512 or 1024×1024, for example.

According to the large-scale convolutional neural network 20, one crossbar circuit 44 may not be able to accept inputs from all the feature maps in the convolution layer at the higher hierarchy. A possible solution is to divide the crossbar circuit 44 into two or more crossbar circuits and distribute inputs from many feature maps into the two or more crossbar circuits. In this case, the crossbar circuit 44 includes at least a first crossbar circuit and a second crossbar circuit. The first crossbar circuit performs the convolution operation on a plurality of filters in part of feature maps. The second crossbar circuit is provided independently of the first crossbar circuit and performs the convolution operation on filters in another part of feature maps that differ from the feature maps in which the first crossbar circuit performs the convolution operation.

Figure 7:
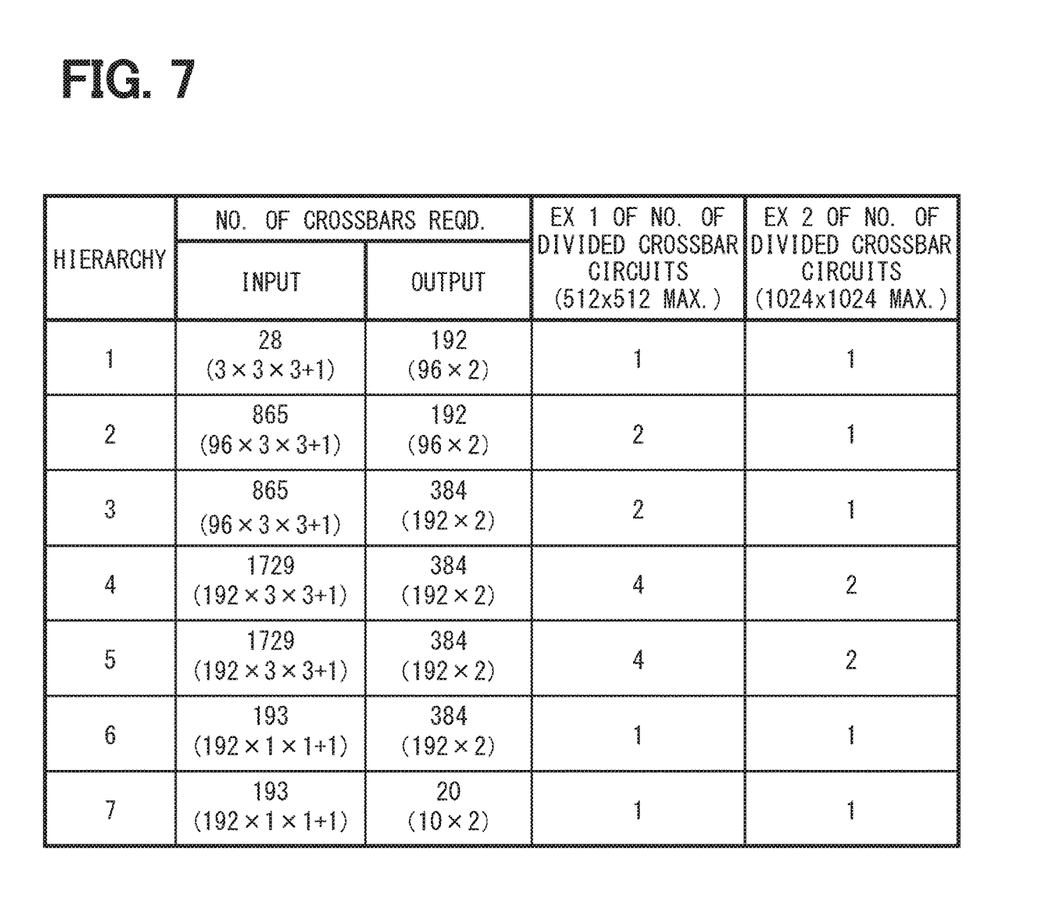
FIG. 7 is a diagram illustrating the number of divisions of crossbar circuits needed when the number of input bars and output bars for a crossbar circuit is limited to 512×512 and 1024×1024 in the case illustrated in FIG. 6.

FIG. 7 illustrates the number of necessary divisions of the crossbar circuit 44 depending on whether the number of the input bars 50 and the output bars 51 and 52 in the crossbar circuit 44 is limited to 512×512 or 1024×1024 in the case of FIG. 6.

In FIG. 7, "example 1 of the number of divisions" shows that the number of the input bars 50 and the output bars 51 and 52 is limited to 512×512. The second and third convolution layers 22 and 23 require the 865 input bars 50 and therefore require two crossbar circuits. Therefore, the number of divisions of the crossbar circuit is 2 for the second and third convolution layers 22 and 23. The fourth and fifth convolution layers 24 and 25 require the 1729 input bars 50 and therefore require four crossbar circuits. Therefore, the number of divisions of the crossbar circuit is 4 for the fourth and fifth convolution layers 24 and 25.

The division of the crossbar circuit is slightly restrained when the maximum number of the input bars 50 and the output bars 51 and 52 is limited to 1024×1024 for the crossbar circuit. In FIG. 7, "example 2 of the number of divisions" shows that the fourth and fifth convolution layers 24 and 25 require two crossbar circuits. Therefore, the number of divisions of the crossbar circuit is 2.

When the crossbar circuit is divided, the two or more divided crossbar circuits mainly perform the convolution operation by using part of feature maps as inputs that differ from each other. In other words, distinct outputs from the divided crossbar circuits are not based on all the input feature maps. The recognition performance may degrade if the outputs are directly used to continue processes in the convolutional neural network 20.

Figure 8:
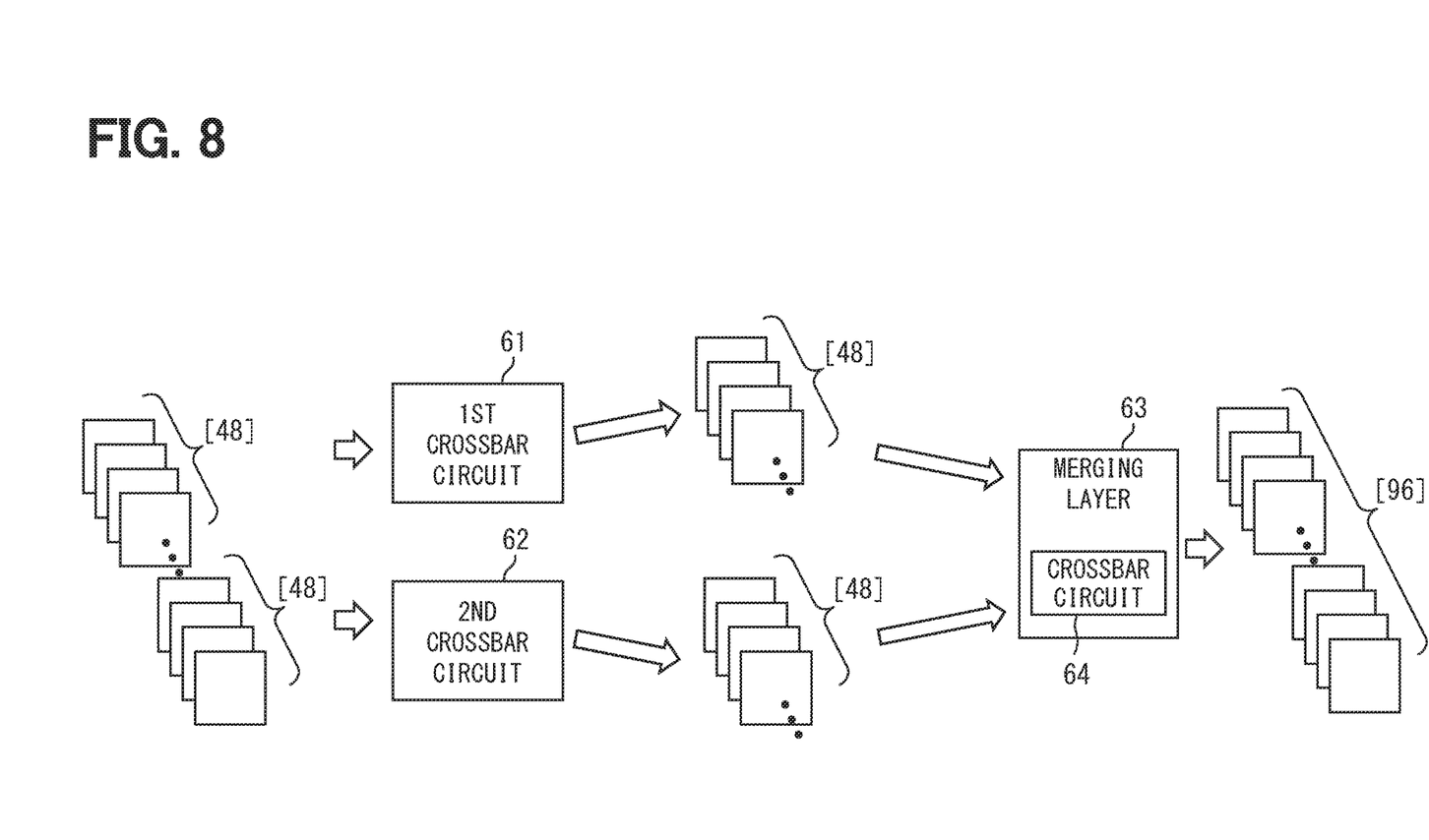
FIG. 8 is a diagram illustrating a configuration including a merging layer that merges operation results from two or more crossbar circuits when a crossbar circuit is divided into two or more crossbar circuits.

As a solution, the present embodiment provides a merging layer 63 as illustrated in FIG. 8. When the crossbar circuit 44 is divided into the two or more first and second crossbar circuits 61 and 62, the merging layer 63 merges pixel values as elements corresponding to arithmetic results from the two or more first and second crossbar circuits 61 and 62.

The merging layer 63 includes a crossbar circuit 64 similar to those of the convolution layers 21 through 27. The crossbar circuit 64 performs the 1×1 convolution operation similarly to the sixth and seventh convolution layers 26 and 27 as above. The first crossbar circuit 61 and the second crossbar circuit 62 generate arithmetic results as images. The crossbar circuit 64 in the merging layer 63 operates to multiply a weight for each 1×1-size filter by a pixel value at the same position in an image as an arithmetic result from the divided first and second crossbar circuits 61 and 62 and add the resulting values to each other. The number of filters in the merging layer 63 is set to be equal to the number of filters used in the corresponding convolution layer. A filter weight in the merging layer 63 is learned simultaneously with the filter weight learning in the crossbar circuits 44, 61, and 62 as above.

The merging layer 63 merges feature maps (images) generated from the first and second crossbar circuits 61 and 62. The same number of elements (pixels) results from the convolution operation in the first crossbar circuit 61, the convolution operation in the second crossbar circuit 62, and the merge operation in the merging layer 63.

The description below more specifically explains the division of the crossbar circuit 44 and the merging layer 63 with reference to FIG. 8. FIG. 8 assumes that division example 1 of limiting the number of crossbar circuits 44 to 512×512 divides the crossbar circuit 44 in the second convolution layer 22 into two, namely, the first and second crossbar circuits 61 and 62. On this condition, FIG. 8 illustrates the number of feature maps input to the first and second crossbar circuits 61 and 62, the number of feature maps output from the first and second crossbar circuits 61 and 62, and the number of feature maps output from the crossbar circuit 64 in the merging layer 63.

As above, the first convolution layer 21 uses 96 filters. The second convolution layer 22 is supplied with input data, namely, 96 feature maps as many as the filters. As illustrated in FIG. 6, the second convolution layer 22 requires 865 input bars if one crossbar circuit 44 processes the input data. However, the crossbar circuit 44 is limited to using up to 512 input bars. Therefore, the second convolution layer 22 divides the crossbar circuit 44 into two, namely, the first and second crossbar circuits 61 and 62.

The first crossbar circuit 61 is supplied with 48 out of 96 feature maps contained in the input data. In this case, the number of necessary input bars is found by calculating the number of feature maps (48)×filter size (3×3)+bias input (1)=433, limited to the maximum number. The second convolution layer 22 uses 96 filters. The first crossbar circuit 61 is configured to perform the convolution operation using 48 filters, half the filters used for the second convolution layer 22. Therefore, the number of output bars for the first crossbar circuit is found by calculating one set of output bars (2)×the number of filters (48)=96. The first crossbar circuit 61 generates the 48 first feature maps because 48 filters are used.

The second crossbar circuit 62 performs the convolution operation on the filters corresponding to another part of feature maps different from those targeted at the convolution operation in the first crossbar circuit 61. Therefore, the second crossbar circuit 62 is also supplied with 48 remaining feature maps that are not supplied to the first crossbar circuit 61 and belong to 96 feature maps contained in the input data. The second crossbar circuit 62 performs the convolution operation on 48 remaining filters other than those targeted at the convolution operation in the first crossbar circuit 61. Similarly to the first crossbar circuit 61, the second crossbar circuit 62 uses the 433 input bars 50 and the 96 output bars 51 and 52. The second crossbar circuit 62 generates the 48 second feature maps.

The first crossbar circuit 61 generates the first feature map. The second crossbar circuit 62 generates the second feature map. The first feature map and the second feature map are supplied as input data to the merging layer 63. According to the first merging layer illustrated in FIG. 9, the number of input bars 50 required for the crossbar circuit 64 in the merging layer 63 is found by calculating (the number of the first feature maps (48)+the number of the second feature maps (48))×filter size (1×1)+bias input=97. The number of the output bars 51 and 52 required for the crossbar circuit 64 is found by calculating one set of output bars (2)×the number of filters (96)=192. The merging layer 63 performs only the 1×1 convolution operation, making it possible to limit the number of the input bars 50 and the number of the output bars 51 and 52 to the maximum number.

Figure 9:
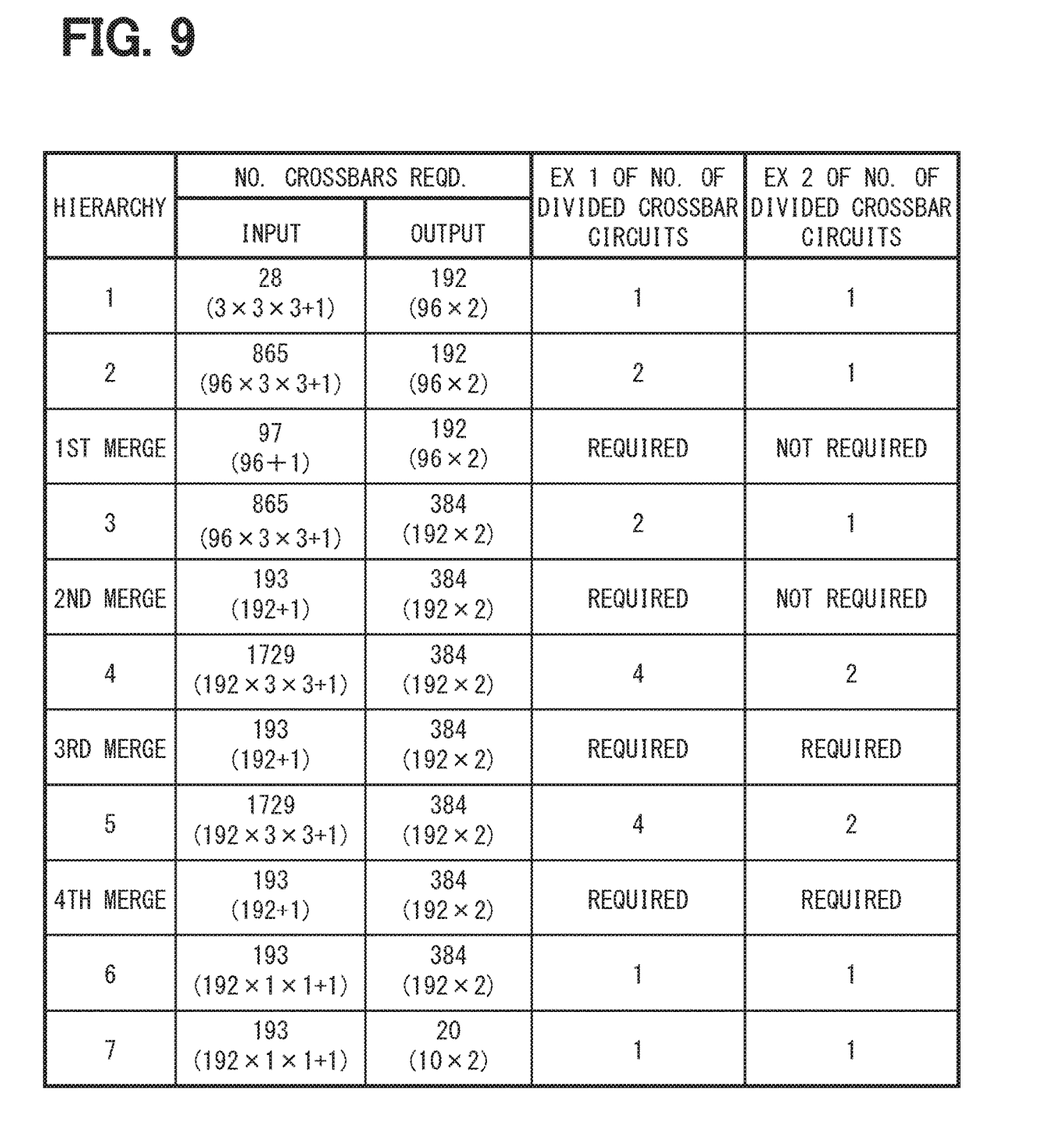
FIG. 9 is a diagram illustrating convolution layers requiring merging layers depending on whether the number of input bars and output bars in a crossbar circuit is limited to 512×512 or 1024×1024 and, when a merging layer is needed, illustrating the number of input bars and output bars for the crossbar circuit configuring the merging layer.

There has been described the first merging layer provided for the second convolution layer 22 when the maximum number of the crossbar circuits 44 is limited to 512×512. Similarly, FIG. 9 shows calculations of the number of input bars and output bars of the crossbar circuits required by the second merging layer provided for the third convolution layer 23, the third merging layer provided for the fourth convolution layer 24, and the fourth merging layer provided for the fifth convolution layer 25. The second through fourth merging layers respectively require 193 input bars and 384 output bars.

When the maximum number of the crossbar circuits 44 is limited to 1024×1024, as illustrated in FIG. 9, the first and second merging layers are unnecessary and only the third and fourth merging layers are provided. In this case, the crossbar circuit in the third and fourth merging layers requires 193 input bars and 384 output bars similarly to the above-mentioned example.

When the crossbar circuit in the convolution layer is divided into two or more, the merging layer is provided to merge elements corresponding to arithmetic results from the divided crossbar circuits. Feature maps output from the merging layer are thereby based on all the input feature maps. Therefore, it is possible to prevent the recognition performance from degrading by using the feature maps output from the merging layer to continue the process in the convolutional neural network later on.

FIG. 8 only provides an example as to the number of feature maps input to the first and second crossbar circuits 61 and 62 and the number of feature maps output from the first and second crossbar circuits 61 and 62. The first and second crossbar circuits 61 and 62 may be supplied with the different number of feature maps as long as the number of input bars is limited to the maximum value. The first crossbar circuit 61 and the second crossbar circuit 62 may each generate different numbers of feature maps.

The example in FIG. 8 may be provided differently. The first crossbar circuit 61 may perform the convolution operation using all filters on part of input data such as 48 feature maps to generate all the first feature maps as many as 96, for example. The second crossbar circuit 62 may also perform the convolution operation using all filters on another part of input data such as 48 feature maps to generate all the second feature maps as many as 96, for example. In this case, however, the number of input bars for the crossbar circuit 64 in the merging layer 63 is found by calculating the number of first feature maps+the number of second feature maps+ bias input. The result is larger than the above-mentioned embodiment.

Figure 10:
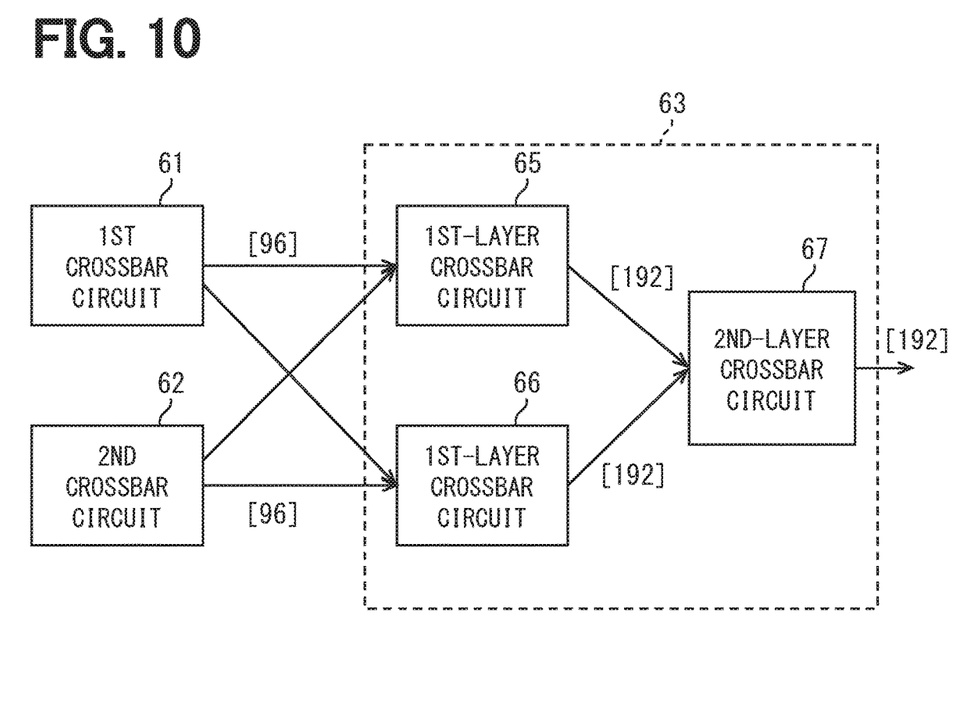
FIG. 10 illustrates a configuration as a modification to form a merging layer out of hierarchically provided first and second crossbar circuits.

The inside of the merging layer 63 may be configured hierarchically. As illustrated in FIG. 10, the merging layer 63 may be configured to hierarchically provide first-layer crossbar circuits 65 and 66 and a second-layer crossbar circuit 67. FIG. 10 provides an example as to the number of feature maps input to the crossbar circuits 65 through 67 and the number of feature maps output from the crossbar circuits 65 through 67 when the fourth convolution layer 24 includes the hierarchical merging layer 63. The description below explains a hierarchical configuration of the merging layer 63 with reference to FIG. 10.

As above, the third convolution layer 23 generates 192 feature maps of which 96 feature maps are input to the first crossbar circuit 61 in the fourth convolution layer 24. The first crossbar circuit 61 performs the convolution operation by using 96 out of 192 filters in total to generate 96 feature maps. Similarly, the second crossbar circuit 62 in the fourth convolution layer 24 is supplied with 96 remaining feature maps other than those input to the first crossbar circuit 61. The second crossbar circuit 62 performs the convolution operation on 48 remaining filters other than those targeted at the convolution operation in the first crossbar circuit 61 to generate 96 feature maps.

The merging layer 63 includes the two first-layer crossbar circuits 65 and 66. There may be provided three or more first-layer crossbar circuits 65 and 66. The two first-layer crossbar circuits 65 and 66 perform the convolution operation based on the 1×1-size filter by using inputs such as a feature map generated from the first crossbar circuit 61 and a feature map generated from the second crossbar circuit 62. The first-layer crossbar circuits 65 and 66 use 192 filters and generate 192 feature maps. The two first-layer crossbar circuits 65 and 66 use filters that are independently provided and learned. Therefore, the two first-layer crossbar circuits 65 and 66 use the differently weighted filters.

The second-layer crossbar circuit 67 performs the convolution operation based on the 1×1-size filter by using inputs such as feature maps generated by the two first-layer crossbar circuits 65 and 66 and generates 192 feature maps as output from the fourth convolution layer 24.

Figure 11:
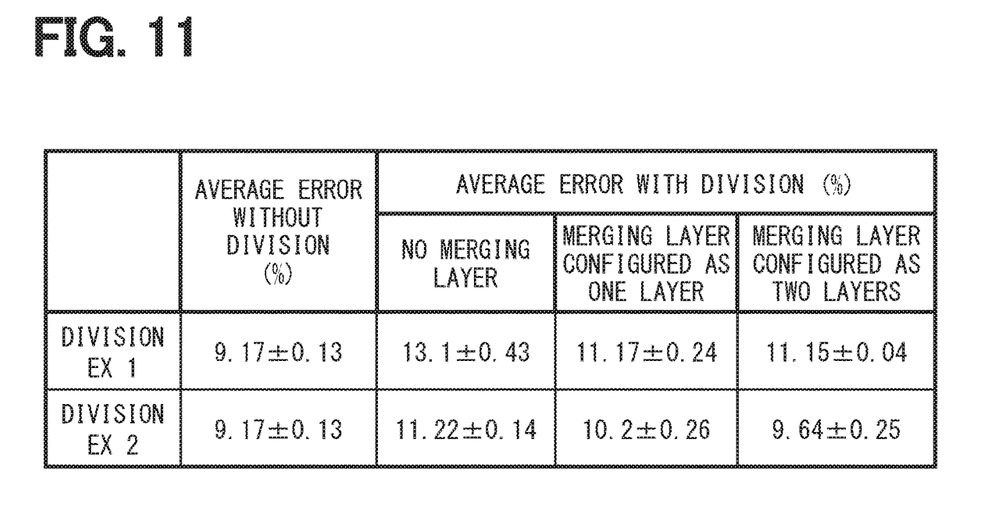
FIG. 11 is a diagram illustrating degrees of improvement in average error rates concerning the classification of input data into each category according to the embodiment and the modification.

The description below explains the effect of hierarchically configuring the merging layer 63 based on FIG. 11. When the convolutional neural network 20 is configured on a computer without division of the crossbar circuit 44 in each of the convolution layer 21 through 27, the classification of input data into the categories causes an average error rate of 9.17±0.13%.

When the crossbar circuit 44 in each of the convolution layers 21 through 27 is divided and the above-mentioned merging layer 63 is not provided, the average error rate degrades as 13.1±0.43% in division example 1 and 11.22±0.14% in division example 2. When there is provided the merging layer 63 including the one-layer crossbar circuit 64 as described in the above-mentioned embodiment, the average error rate improves as 11.17±0.24% in division example 1 and 10.02±0.26% in division example 2. When there is provided the merging layer 63 including the two-layer crossbar circuits 65 and 66 as illustrated in FIG. 10, it is confirmed that the average error rate can be further improved as 11.15±0.04% in division example 1 and 9.64±0.25% in division example 2.

The above-mentioned embodiment has described the example of using the crossbar circuit 44 to perform the convolution operation in all the convolution layers 21 through 27. However, the divided crossbar circuits 61 and 62 and the merging layer may be used to perform the convolution operation in at least one convolution layer that requires division of the crossbar circuit 44. The microcomputer 40 may perform the convolution operation in the other convolution layers.

When the microcomputer 40 instead of the crossbar circuit 64 performs the merge process in the merging layer 63 according to the above-mentioned embodiment, the merging layer 63 may be configured as a fully connected layer to weight and add all elements (all pixels) in all feature maps.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A convolutional neural network comprising:
   a plurality of convolution layers; and
   a merging layer, wherein:
   at least one of the convolution layers includes a crossbar circuit having a plurality of input bars, a plurality of output bars intersecting with the input bars, and a plurality of weight assignment elements that are arranged at intersections between the input bars and the output bars and assign weights to input signals input into the input bars;
   the weights correspond to a plurality of filters to be convoluted;
   under a condition that each weight assignment element assigns a weight to an input signal input into each of the input bars, the crossbar circuit in the at least one of the convolution layers performs a convolution operation of the filters in an analog region with respect to input data including the input signal by adding the input signals at each output bar;
   the input data includes a plurality of feature maps;
   the crossbar circuit in the at least one of the convolution layers includes a first crossbar circuit and a second crossbar circuit;
   the first crossbar circuit is configured to perform the convolution operation of the filters with respect to a part of the feature maps;
   the second crossbar circuit is arranged independently from the first crossbar circuit, and is configured to perform the convolution operation of the filters with respect to another part of feature maps different from the part of the feature maps as a target of the convolution operation in the first crossbar circuit; and
   the merging layer merges a convolution operation result of the first crossbar circuit with a convolution operation result of the second crossbar circuit, wherein:
   the merging layer merges an element in the convolution operation result of the first crossbar circuit with an element in the convolution operation result of the second crossbar circuit corresponding to the element in the convolution operation result of the first crossbar circuit;
   the merging layer includes a first merging layer and a second merging layer which are arranged hierarchically;
   the first merging layer outputs a plurality of merge results as a merge result of merging an element in the convolution operation result of the first crossbar circuit with an element in the convolution operation result of the second crossbar circuit corresponding to the element in the convolution operation result of the first crossbar circuit; and
   the second merging layer merges an element of one of the merge results with an element of another one of the merge results corresponding to the element of the one of the merge results.

2. The convolutional neural network according to claim 1, wherein:
   the merging layer includes a third crossbar circuit having a plurality of input bars, a plurality of output bars intersecting with the input bars, and a plurality of weight assignment elements that are arranged at intersections between the input bars and the output bars and assigns weights to elements of convolution operation results input into the input bars; and
   under a condition that each weight assignment element assigns the weights to the elements, the third crossbar circuit in the merging layer adds, at each output bar, an element in the convolution operation result of the first crossbar circuit with an element in the convolution operation result of the second crossbar circuit corresponding to the element in the convolution operation result of the first crossbar circuit.

3. The convolutional neural network according to claim 2, wherein:
   a weight of the weight assignment element of the crossbar circuit in the at least one of the convolution layers and a weight of the weight assignment element of the third crossbar circuit in the merging layer are set based on a learning result of an external device.

4. The convolutional neural network according to claim 1, wherein:
   a numerical number of elements in the convolution operation result of the first crossbar circuit, a numerical number of elements in the convolution operation result of the second crossbar circuit, and a numerical number of elements in a merge result of the merging layer are equal to each other.

5. A convolutional neural network comprising:
   a plurality of convolution layers; and
   a merging layer, wherein:
   at least one of the convolution layers includes a crossbar circuit having a plurality of input bars, a plurality of output bars intersecting with the input bars, and a plurality of weight assignment elements that are arranged at intersections between the input bars and the output bars and assign weights to input signals input into the input bars;
   the weights correspond to a plurality of filters to be convoluted;
   under a condition that each weight assignment element assigns a weight to an input signal input into each of the input bars, the crossbar circuit in the at least one of the convolution layers performs a convolution operation of the filters in an analog region with respect to input data including the input signal by adding the input signals at each output bar;
   the input data includes a plurality of feature maps;
   the crossbar circuit in the at least one of the convolution layers includes a first crossbar circuit and a second crossbar circuit;

the first crossbar circuit is configured to perform the convolution operation of the filters with respect to a part of the feature maps;

the second crossbar circuit is arranged independently from the first crossbar circuit, and is configured to perform the convolution operation of the filters with respect to another part of feature maps different from the part of the feature maps as a target of the convolution operation in the first crossbar circuit; and the merging layer merges a convolution operation result of the first crossbar circuit with a convolution operation result of the second crossbar circuit, wherein:

the first crossbar circuit performs the convolution operation of a part of the filters and generates a feature map corresponding to a numerical number of the part of the filters of which the convolution operation is performed; and the second crossbar circuit performs the convolution operation of another part of the filters different from the part of the filters of which the convolution operation is performed by the first crossbar circuit, and generates a feature map corresponding to a numerical number of the another part of the filters of which the convolution operation is performed by the second crossbar circuit.

* * * * *